United States Patent

Buerger

[11] 3,876,257
[45] Apr. 8, 1975

[54] PLASTIC WHEEL COVER AND METAL LOCKRING COMBINATION

[75] Inventor: Herbert Buerger, Walton, N.Y.
[73] Assignee: Del-Met Corporation, Walton, N.Y.
[22] Filed: Sept. 13, 1973
[21] Appl. No.: 396,844

[52] U.S. Cl. ............................ 301/37 P; 301/37 C
[51] Int. Cl. ........................................... B60b 7/06
[58] Field of Search .......... 301/37 P, 37 R, 37 TC, 301/37 C, 37 CD, 37 B; 52/717, 718

[56] References Cited
UNITED STATES PATENTS

| | | | |
|---|---|---|---|
| 2,970,012 | 1/1961 | Lyon | 301/37 TC |
| 3,416,840 | 12/1968 | Gibbings | 301/37 P |
| 3,532,386 | 10/1970 | Marshal | 301/37 P |
| 3,601,449 | 8/1971 | Buerger | 301/37 P |
| 3,747,984 | 7/1973 | Andrews | 301/37 P |
| 3,771,834 | 11/1973 | Kretschmer | 301/37 P |

Primary Examiner—M. Henson Wood, Jr.
Assistant Examiner—Reinhard J. Eisenzopf
Attorney, Agent, or Firm—J. B. Felshin; Marvin Feldman

[57] ABSTRACT

The plastic wheel cover has an annular cylindrical slot on the side thereof to face the wheel. The metal lockring has grip fingers that are pushed into the annular slot and grip an inner surface of the slot to hold the lockring from loosening. The lockring has alternating longer and shorter spring fingers with bent back lips to grip the inner surface of the tire bearing rim of the wheel. At equiangularly spaced points there are webs interconnecting the outer and inner cylindrical flanges of the wheel cover that form the cylindrical slot, to reinforce said flanges. Said wheel cover also has equiangularly spaced lugs outside of said annular slot to engage the tire rim for positioning the cover in correct coaxial and axial relation to the rim.

17 Claims, 14 Drawing Figures

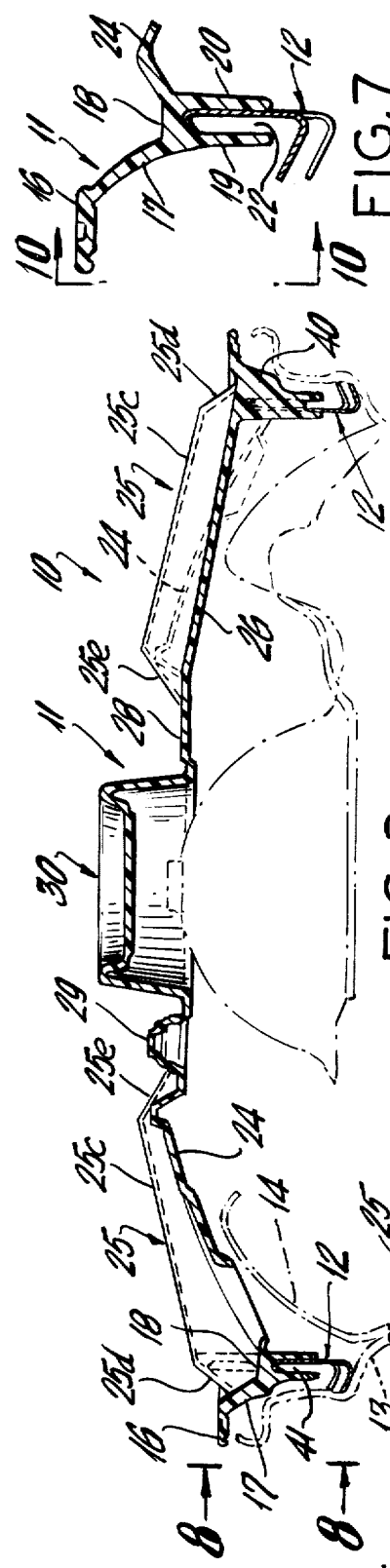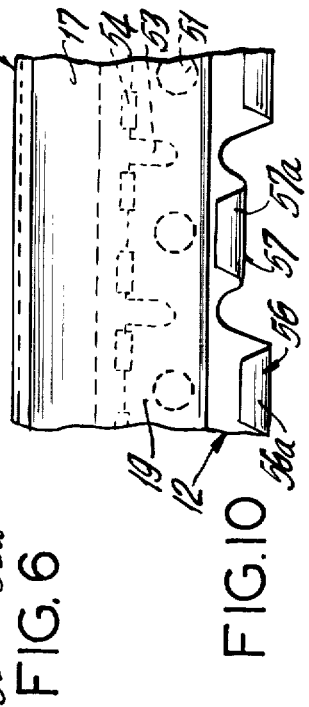

PLASTIC WHEEL COVER AND METAL LOCKRING COMBINATION

This invention relates to plastic wheel covers for vehicle tire wheels and to metal lockrings for attaching such covers to the wheels.

An object of this invention is to provide structure of the character described in which the plastic wheel cover has an annular, cylindrical slot formed between two cylindrical flanges to receive grip fingers on the lockring, the construction being such that the lockring is firmly held to the cover to prevent accidental loosening of the cover from the lockring.

Another object of this invention is to provide a plastic cover of the character described having equiangularly spaced webs interconnecting said cylindrical flanges to maintain the spacing between said flanges all around.

Still another object of this invention is to provide in structure of the character described, a metal lockring having at one side, grip fingers to grip the cover inside the annular slot, and at its opposite side, spring grip fingers to grip the tire receiving rim of the vehicle wheel.

Yet another object of this invention is to provide in structure of the character described, a plastic wheel cover having a plurality of equiangularly spaced lugs, outside of said annular slot, to position said cover accurately and centrally relative to the tire rim of the vehicle wheel.

A further object of this invention is to provide a strong, rugged and durable combination plastic wheel cover and metal lockring, which shall be relatively inexpensive to manufacture, easy to apply, which shall stay in place on the wheel after application thereto, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described and of which the scope of invention will be indicated in the following claims.

IN THE DRAWINGS:

FIG. 3 is a cross-sectional view taken on line 3—3 of FIG. 1 but with the lockring assembled with the cover;

FIG. 5 is a partial inside end view of the lockring;

FIG. 6 is a cross-sectional view taken on line 6—6 of FIG. 1, but passing through the cover and lockring assembled with said cover;

FIG. 7 is a cross-sectional view similar to FIG. 6 but taken on line 7—7 of FIG. 1;

FIG. 8 is a partial view taken on line 8—8 of FIG. 3;

FIG. 9 is a partial view taken on line 9—9 of FIG. 6;

FIG. 10 is a partial view taken on line 10—10 of FIG. 7;

Figure 1:
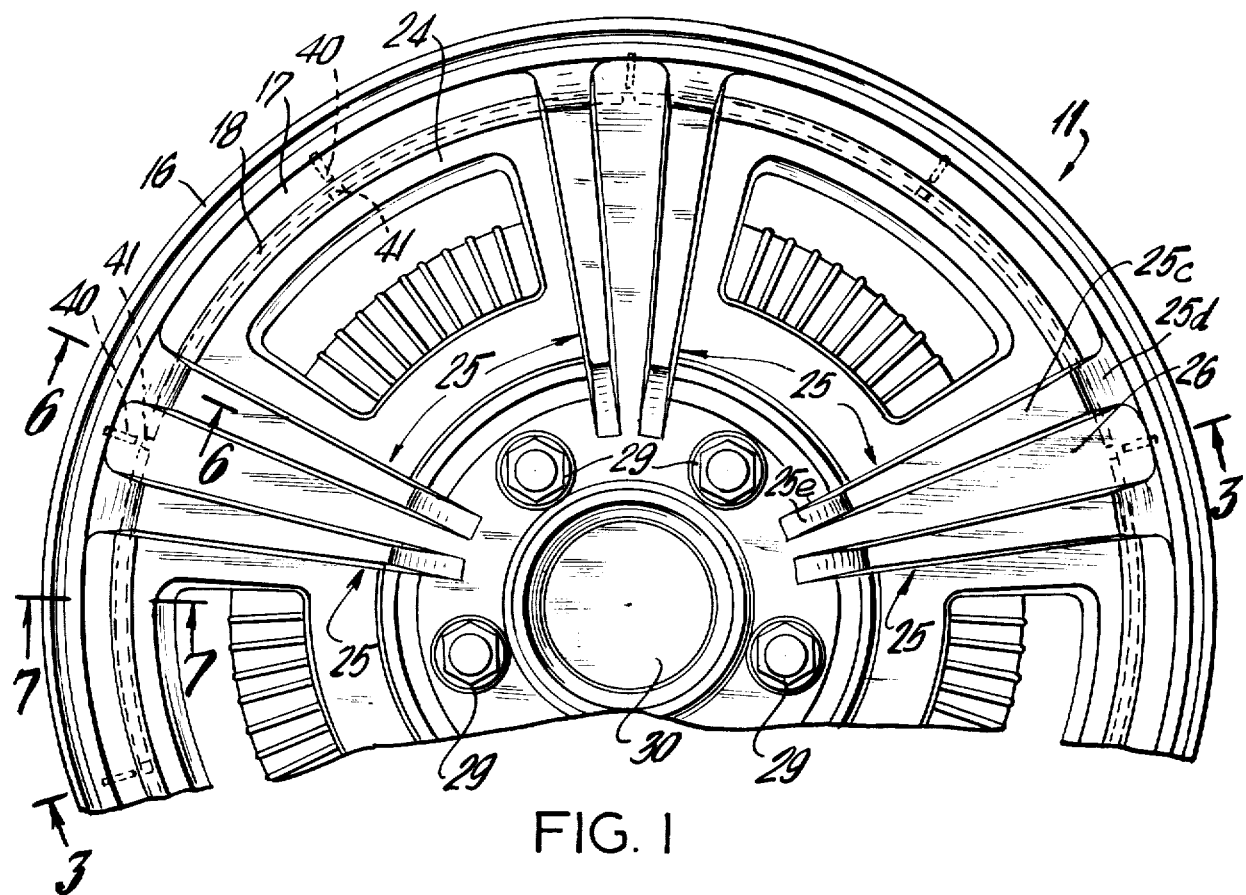
FIG. 1 is a partial outside view of a plastic cover forming one part of the combination invention disclosed herein.
Figure 2:
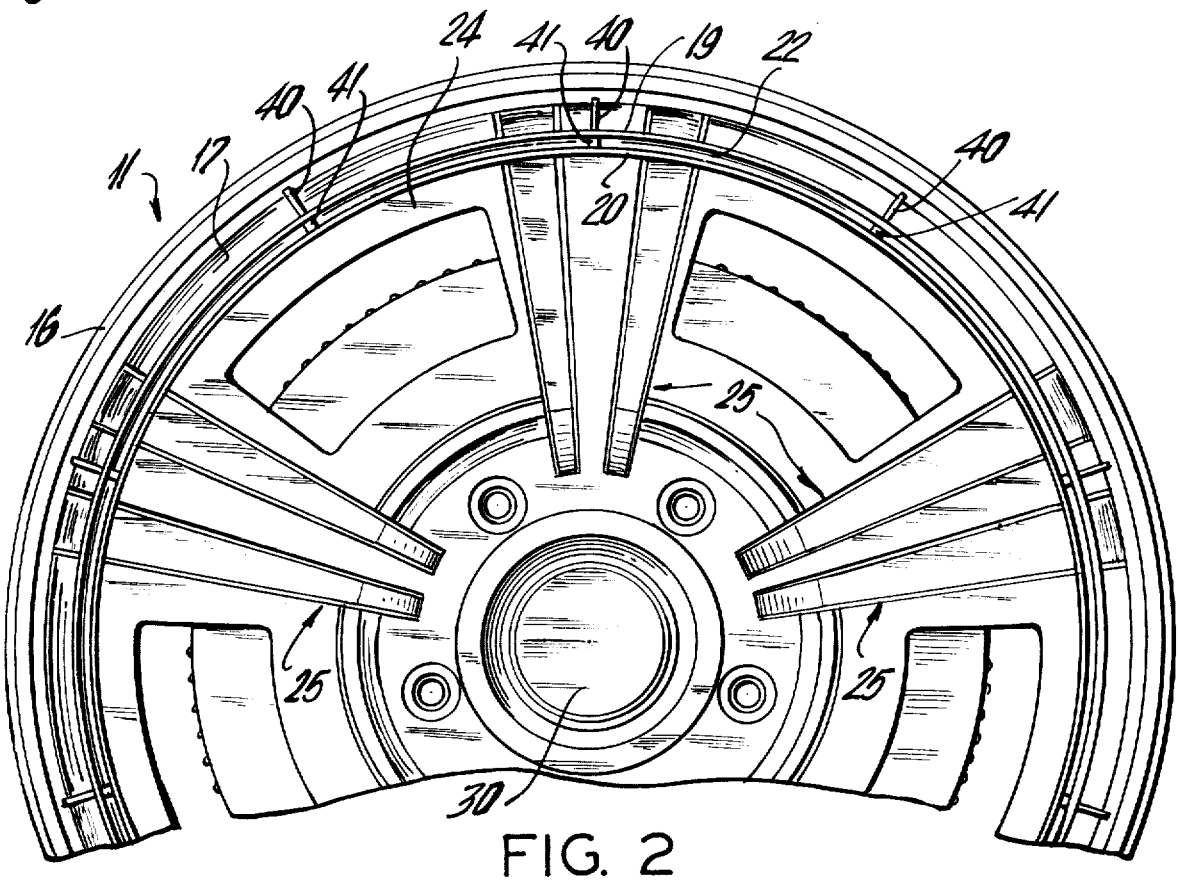
FIG. 2 is a partial inside view thereof.
Figure 11:
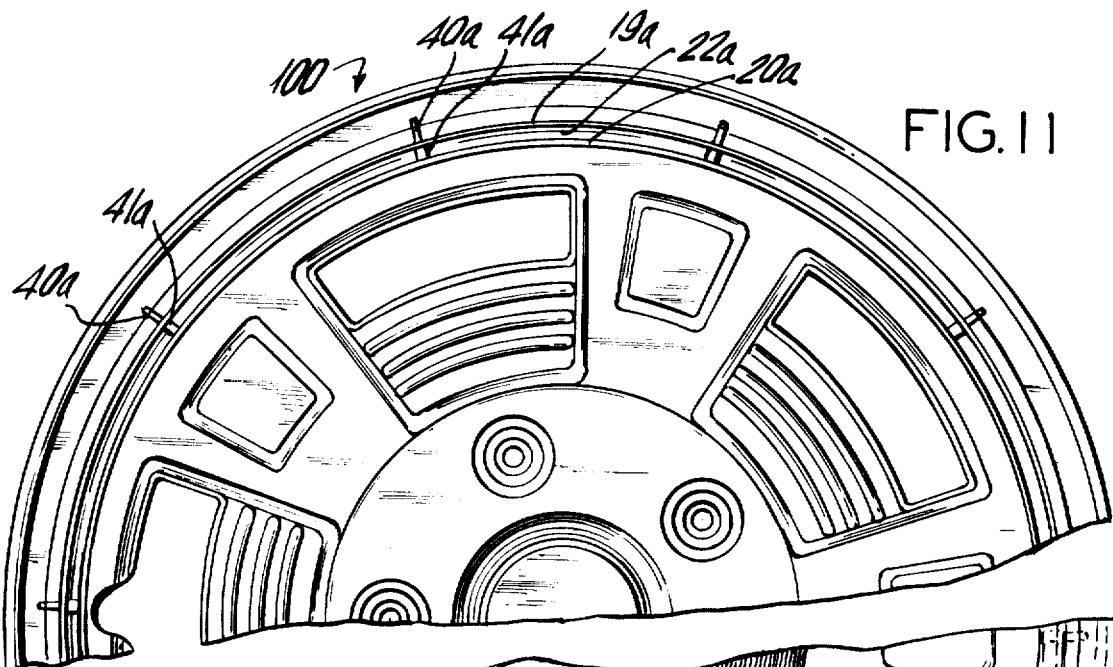
FIG. 11 is a partial inside view of a plastic wheel cover forming part of the invention disclosed herein but illustrating a modified form of cover.

Referring now in detail to the drawing and particularly to FIGS. 1 to 10, nuumeral 10 designates a combination wheel cover and lockring assembly embodying the invention and comprising a rigid hard molded plastic wheel cover 11 assembled with a spring metal lockring 12 for mounting the cover on the tire rim 13 of a vehicle wheel 14, such as an automobile wheel.

The wheel cover 11 may be made of rigid plastic and may have various ornamental shapes. It is circular generally. One such cover is shown at 11 in FIGS. 1, 2, 3, 6, 7, 8, 9 and 10 of the drawing. Said cover 11 comprises an annular, outer peripheral flange 16 in a flat plane. Extending axially inwardly, relative to tire rim 13 of wheel 14, from the radially inner end of flange 16, is a flange 17 decreasing in diameter gradually inwardly and from which extends an annular wall 18 in a flat plane. Extending from annular wall 18 are a pair of spaced outer and inner cylindrical flanges 19, 20, respectively, forming a cylindrical groove or slot 22 therebetween. Extending radially inwardly from annular wall 18, is a radially outwardly curved wall 24 formed with spaced pairs of spaced radial outwardly recessed portions 25 simulating ribs or spokes. The portions 25 of each pair are closely spaced. Between each pair of ribs 25 is a wall portion 26. Each rib 25 has a shorter side wall 25a, a longer opposite side wall 25b, a top wall 25c, a sloping radially outer end wall 25d and a radially inner sloping end wall 25e.

Radially inwardly of the ribs 25 is an annular wall 28 which may be integrally formed with bolt simulating portions 29 and a central hub shaped portion 30. The cylindrical walls 19, 20 extend axially outwardly to a greater extent at the radial outer ends of walls 26, as shown at 31, than at the radial outer ends 18 of the walls 24. Thus the cylindrical groove or slot 22 is deeper, as shown at 22a in FIG. 6 than shown at FIG. 7.

The cover 11 has a series of equiangularly spaced outer lugs 40 to contact the tire rim 13 for centering the cover relative to the rim.

Said cover may also be provided with webs 41 interconnecting flanges 19, 20 to keep then spaced. Said webs 41 extend axially inwardly from the ends of groove 22 which reach the walls 18, 26 but stop short of the inner rim edges of said cylindrical walls 19, 20. Webs 41 also prevent relative rotation between the lockring and the cover.

The lockring 12 is preferably made of spring steel. It is made from a straight strip S (shown in FIG. 4) having a flat central longitudinal portion 50 provided with equally spaced holes 51. Extending to one side of the longitudinal portion 50 are similar portions 52 separated by slots 53. Extending upwardly from portions 52 are pairs of spaced inwardly curved or inclined portions 54 having end edges 55. Extending from the opposite side of said longitudinal portion 50 are alternating longer and shorter spring fingers 56, 57 all around the lockring, having bent back lips 56a, 57a formed with outer edges 56b, 57b, respectively. At the ends of the strip are flat portions 60 made without portions 52, 54 and without spring fingers 56, 57. To form the lockring, the strip S is bent into circular form, with the portions 54 and lips 56a, 57a projecting radially outwardly. Each end portion 60 overlaps the portion with the spring fingers next to the end portion 60 at the other end of the strip. The end portions 60 are eyeleted or grommetted or riveted to the portions of the spring strip that overlap said portions. The grommets may pass through registering opening 51 in the end portions 60 and in the portions of the strip which said portions overlap.

The lockring should be of same diameter as the slot 22. To assemble the lockring with the cover, the portions 54 on the lockring are pushed into the slot 22, with the webs 41 entering the slots 53 wherever the webs are aligned with such slots. There may be more slots 53 than webs 41. In fact 5 or 10 webs (and same number of lugs 40), but more slot 53 than 10, can be utilized.

The outer edges 55 of fingers 54 dig or press into the inner surface of flange 19 to keep the lockring from being pulled out or loosening. The longer and shorter spring fingers 56, 57 project beyond slot 22 and the outer edges 56b, 57b of the bent back lips 56a, 57a engage the underside of the tire rim 13 to hold the lockring 12, and hence the cover 11 to the wheel.

Figure 12:
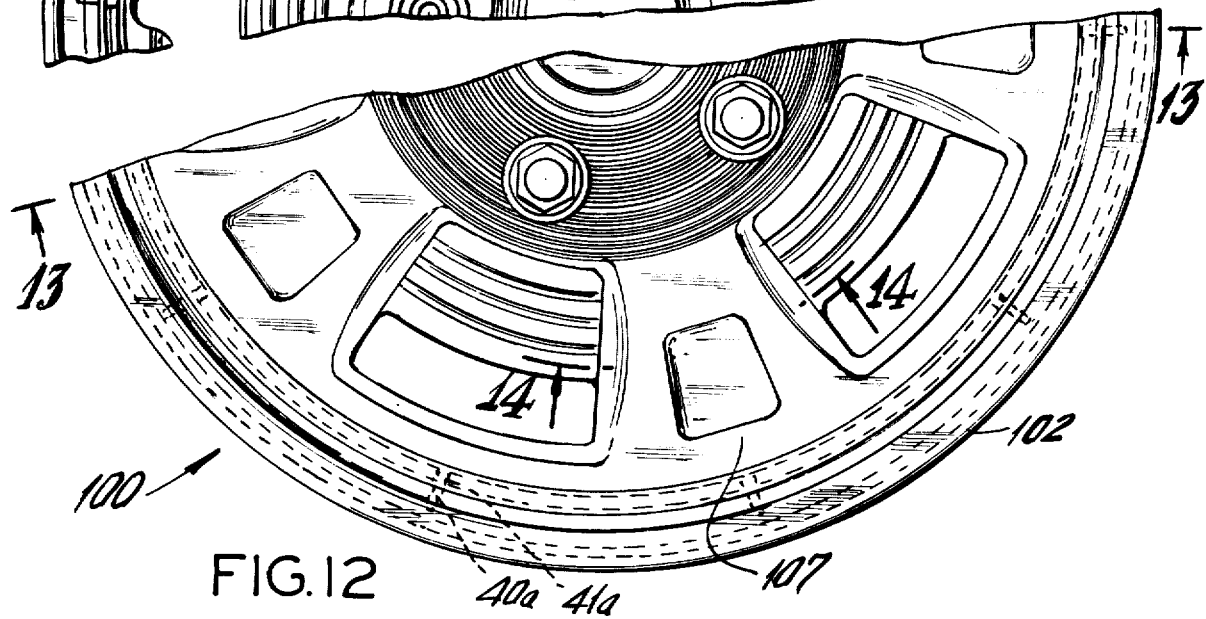
FIG. 12 is a partial outside view of the cover shown in FIG. 11.
Figure 14:
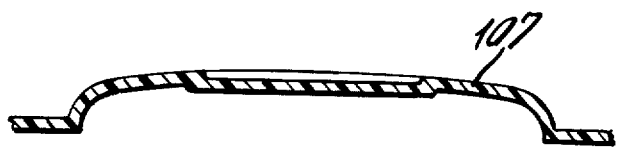
FIG. 14 is a cross-sectional view taken on line 14—14 of FIG. 12.
Figure 13:
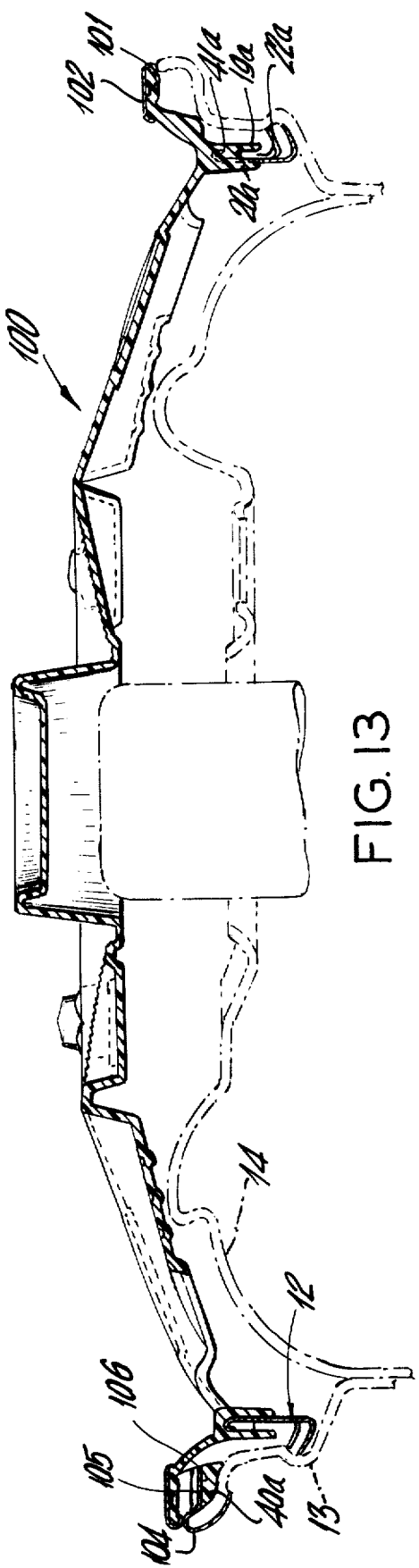
FIG. 13 is a cross-sectional view taken on line 13—13 of FIG. 12 but showing the lockring assembled with the cover.
Figure 4:
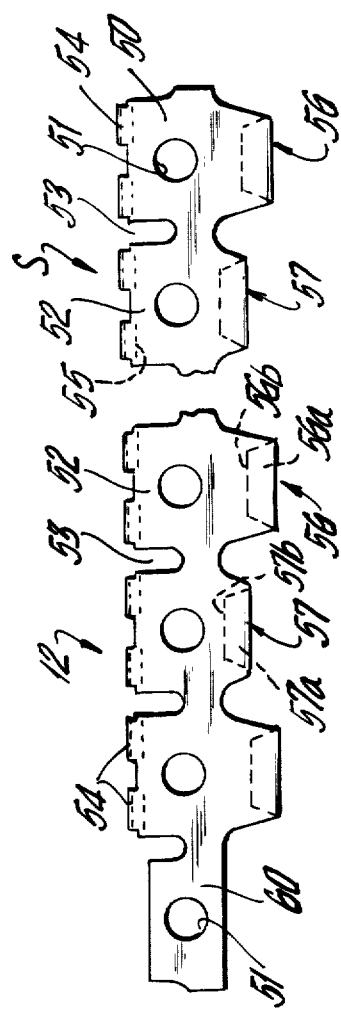
FIG. 4 is a partial bottom view of the lockring in flat condition.

In FIGS. 12, 13, 14 there is shown a modified form of the invention. The lockring may be the same as described above but a different molded plastic cover 100 is shown. The cover 100 may differ in shape and design. It is also made with a cylindrical slot 22a similar to slot 22 except that it may be of similar axial depth throughout. It has radial webs 41a interconnecting the cylindrical walls 19a, 20a, to be received in slots 53 of the lockring 12. It may also have lugs 40a to contact the tire rim 13. Flange 101 of cover 100, corresponding to flange 16 of cover 11, may be covered by an annular metal clip 102 for decorative purposes. The cover may be clipped to the rim 13 by clips 104 having arms 105 passing through passages 106.

Cover 100 may have outwardly buldging part 107, as shown in FIG. 14.

It will thus be seen that there is provided an article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, is to be interpreted as illustrative only.

I claim:

1. A substantially rigid plastic wheel cover having a cylindrical slot extending in one axial direction, and a lockring having portions on one side thereof extending in an opposite axial direction and projecting into and disposed in the slot and formed with means grippingly contacting opposite inner surfaces of said slot, for locking the lockring to said cover, and having portions on the other side thereof extending in said one direction and provided with means to grip the tire rim of a vehicle wheel.

2. The combination of claim 1, said cover having angularly spaced webs within said slot, and said lockring having angularly spaced slots receiving said webs.

3. The combination of claim 2, said webs being equiangularly spaced.

4. The combination of claim 1, said rim grip means comprising alternating longer and shorter spring fingers all around the lockring.

5. The combination of claim 4, said spring fingers comprising bent back lips having edges to engage said rim.

6. The combination of claim 1, said means on said one side of said lockring, comprising radially outwardly extending fingers having outer edges contacting a surface of said slot.

7. The combination of claim 1, said lockring being made of spring steel.

8. The combination of claim 1, said cover having spaced lugs outside of said slot to engage said tire rim to center said cover with respect to said rim.

9. The combination of claim 8, said cover having angularly spaced webs within said slot, and said lockring having angularly spaced slots receiving said webs.

10. The combination of claim 1, said cover having equiangularly spaced webs within said cylindrical slot, said lockring having slots receiving said webs.

11. The combination of claim 1, said cover having spaced webs within said cylindrical slot, said lockring having slots receiving said webs.

12. A plastic wheel cover having a cylindrical slot, and a lockring having portions on one side thereof disposed in the slot and formed with means gripping a surface of said slot, for locking the lockring to said cover, and having portions on the other side thereof provided with spring fingers to grip the tire rim of a vehicle wheel, said cover having angularly spaced webs within said slot, and said lockring having angularly spaced slots receiving said webs, said webs being equiangularly spaced, said cover having spaced lugs outside of said slot to engage said tire rim to center said cover with respect to said rim.

13. A plastic wheel cover having a cylindrical slot, and a lockring having portion on one side thereof disposed in the slot and formed with means gripping a surface of said slot, for locking the lockring to said cover, and having portions on the other side thereof provided with spring fingers to grip the tire rim of a vehicle wheel, said rim grip means comprising alternating longer and shorter spring fingers all around the lockring, said spring fingers comprising bent back lips having edges to engage said rim, said cover having equiangularly spaced webs within said cylindrical slot, said lockring having slots receiving said webs.

14. The combination of claim 13 said cover having equiangularly spaced lugs spaced radially outwardly of said cylindrical slot for engaging said rim to centralize said cover relative to said rim.

15. A plastic wheel cover having a cylindrical slot, and a lockring having portions on one side thereof disposed in the slot and formed with means gripping a surface of said slot, for locking the lockring to said cover, and having portions on the other side thereof provided with means to grip the tire rim of a vehicle wheel, said cover having angularly spaced webs within said slot, and said lockring having angularly spaced slots receiving said webs, said webs terminating short of the open end of cylindrical slot.

16. The combination of claim 15, said webs extending to the rear closed end of said slot.

17. The combination of claim 16, said cover having spaced lugs disposed radially outwardly of said slot to engage said rim to centralize said cover relative to said rim.

* * * * *